United States Patent [19]

Kellogg

[11] Patent Number: 4,464,075

[45] Date of Patent: Aug. 7, 1984

[54] KNOCKDOWN FITTINGS FOR KNOCKDOWN FURNITURE STRUCTURE

[76] Inventor: Harlan F. Kellogg, 1617 Sprucewood, Rockford, Ill. 61107

[21] Appl. No.: 288,890

[22] Filed: Jul. 31, 1981

[51] Int. Cl.³ .............................. B25G 3/00; F16B 7/08
[52] U.S. Cl. ................................ 403/231; 248/225.2; 5/294; 403/407
[58] Field of Search ...................... 403/231, 407, 346; 108/59; 5/294, 295, 296; 248/225.2, 225.1, 235; 211/186

[56] References Cited

U.S. PATENT DOCUMENTS

| | | |
|---|---|---|
| 1,571,601 | 2/1926 | Richards . |
| 1,940,086 | 12/1933 | Hansen . |
| 2,879,561 | 3/1959 | Rieder . |
| 3,403,641 | 10/1968 | Baker . |
| 3,545,712 | 12/1970 | Ellis . |
| 4,025,216 | 5/1977 | Hives . |
| 4,148,454 | 4/1979 | Carlson et al. . |

FOREIGN PATENT DOCUMENTS

| | | | |
|---|---|---|---|
| 88917 | of 1922 | Austria ................................... | 5/295 |
| 218266 | 1/1910 | Fed. Rep. of Germany .......... | 5/295 |
| 651583 | 10/1928 | France ................................. | 403/231 |

*Primary Examiner*—Andrew V. Kundrat
*Attorney, Agent, or Firm*—Vernon J. Pillote

[57] ABSTRACT

A knockdown fitting for connecting panels in right angular relation. The knockdown fitting includes a pair of bracket members of the same configuration and each having a mounting pad portion and a blade portion extending perpendicular to the inner side of the mounting pad portion and medially between relatively parallel side edges of the mounting pad portion, the blade portions of the bracket members having a notch in their lead end edges adapted to interfit when the blade portions are in relatively crossing right angular relationship.

14 Claims, 8 Drawing Figures

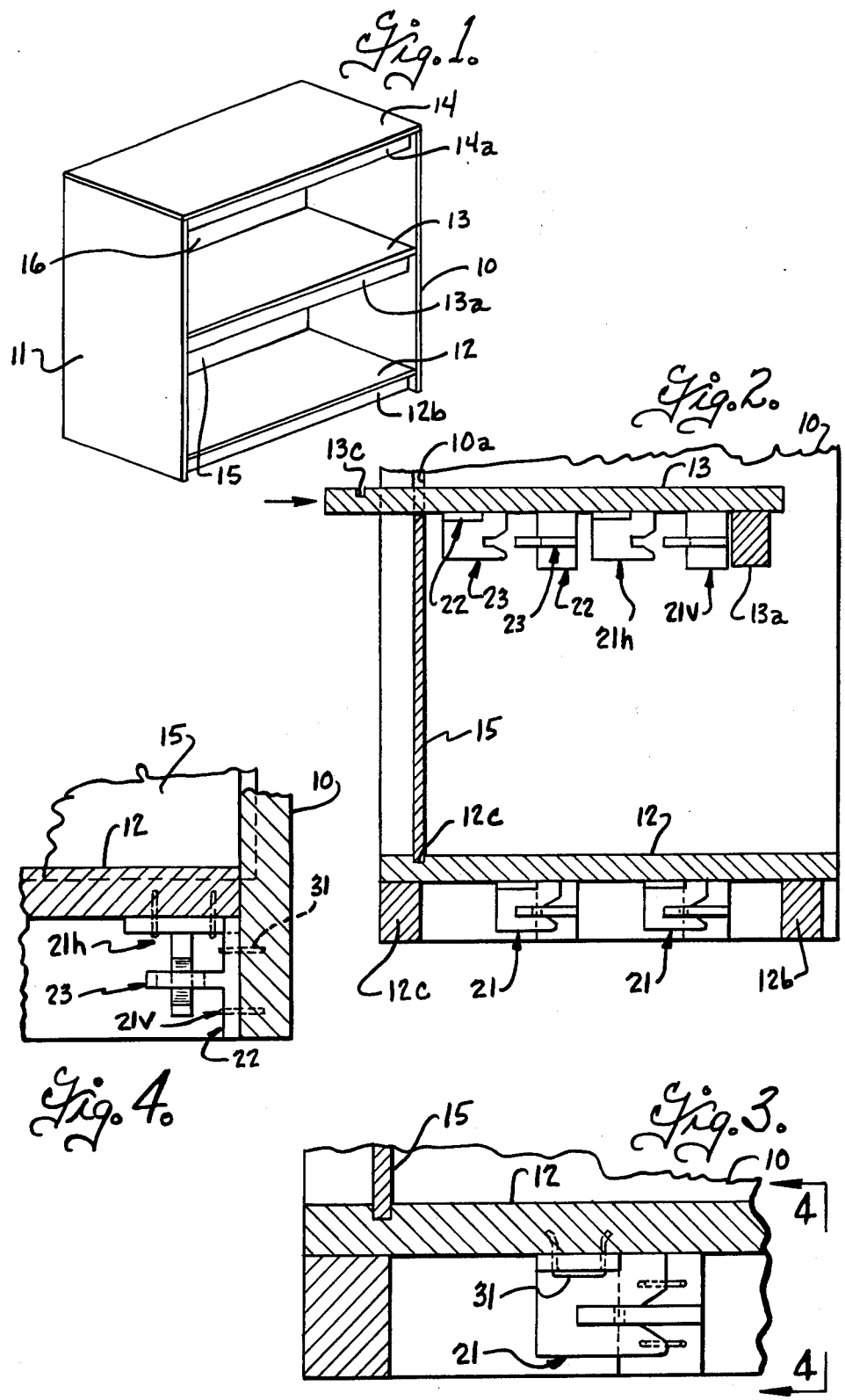

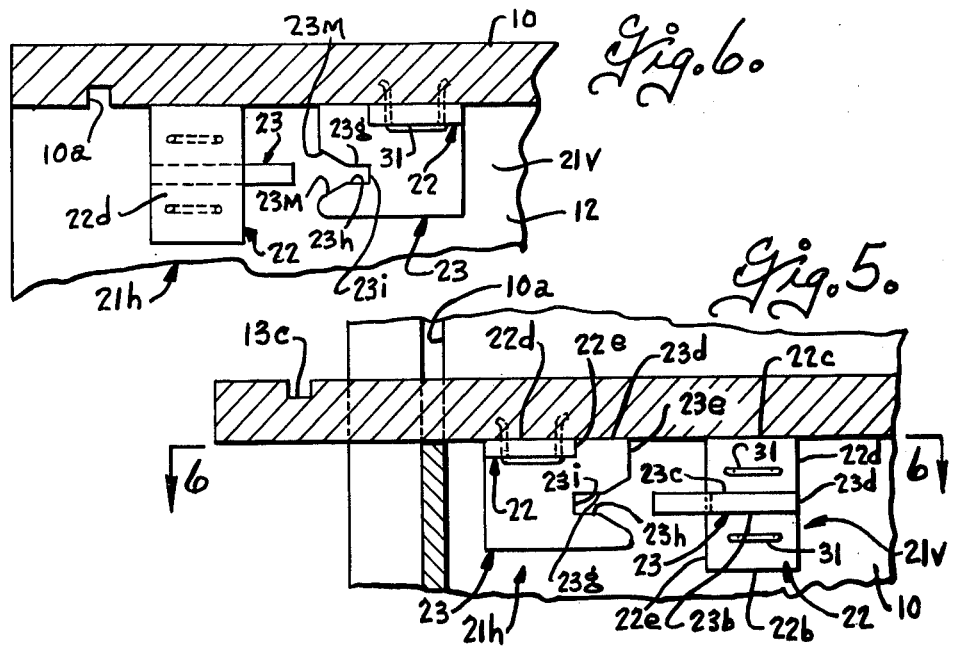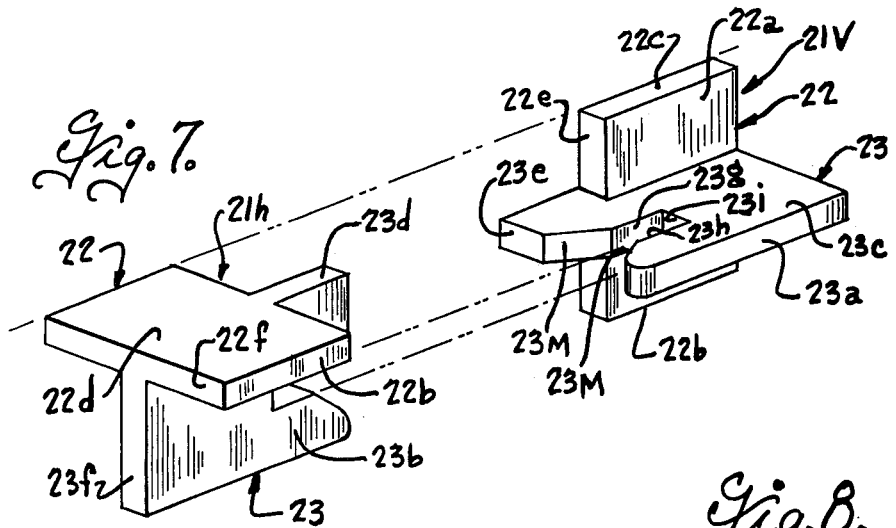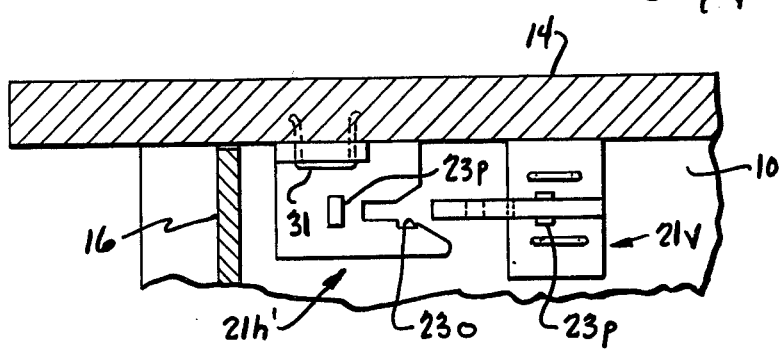

KNOCKDOWN FITTINGS FOR KNOCKDOWN FURNITURE STRUCTURE

BACKGROUND

The present invention relates to knockdown fittings for interconnecting panels in a knockdown furniture structure.

Various knockdown fitting assemblies have heretofore been made in which a first fitting part is attached to one panel of a knockdown furniture structure and a second fitting is attached to the other panel, and the first and second fittings arranged to interlock to enable quick assembly of panels. Many knockdown fitting assemblies, for example as shown in U.S. Pat. Nos. 1,571,601; 1,940,086; 2,879,561; 3,403,641 and 4,025,216 have first and second fitting parts of different configurations and this not only increases the cost of manufacture but also complicates assembly of the fitting parts on the panels. Some knockdown fitting assemblies such as disclosed in U.S. Pat. No. 3,545,712 and 4,148,454 have first and second fitting parts of like configuration. However, this is achieved by providing both a tongue and pocket on each fitting part so that the fitting assembly has two tongues and two pockets. However, only one of the tongues and one of the pockets can interfit at one time and provision of a tongue and pocket on each of the fitting parts can introduce some confusion as to which tongue is to be inserted in which pocket.

SUMMARY OF THE INVENTION

It is a general object of this invention to overcome the disadvantages of the prior art by providing a knockdown fitting assembly in which the first and second fitting parts are of like configuration and in which the parts of the fitting assembly when attached to the panels, can only be assembled in one way.

Another object of this invention is to provide a knockdown fitting assembly in accordance with the foregoing object, and in which like fitting assemblies can be used at both ends of a panel to connect it to other panels of a knockdown furniture structure.

Still another object of this invention is to provide a knockdown fitting assembly in accordance with the foregoing objects and in which the knockdown fitting assemblies provide improved support for panels against movement in a direction perpendicular to the face of the panels.

Accordingly, the present invention provides a knockdown fitting assembly for securely connecting a pair of panels in right angular relation, the knockdown fitting assembly including a pair of bracket members of the same configuration, each bracket member being of unitary construction and having a mounting pad portion and a blade portion extending perpendicular to an inner side face of the mounting pad portion and medially between relatively parallel side edges of the mounting pad portion, the blade portion of each bracket member having a notch in a lead end edge, the notches in the blade portions of the bracket members being adapted to interfit when the pair of bracket members are moved along a path in one direction toward each other with the lead end edges of the blade portions of the pair of bracket members juxtaposed and with the blade portions of the pair of bracket members in relatively crossing right angular relation.

Each bracket member of the fitting assembly is advantageously constructed and arranged so that one side edge of its mounting portion is disposed in a plane through the outer face of the mounting pad portion on the other bracket member when the notches in the blade portions of the pair of bracket members interfit so that an edge of the mounting pad portion of the bracket member attached to one panel will engage a side face on the other panel and vice versa.

These, together with other objects, features and advantages of this invention will become apparent from the following detailed description when taken in connection with the accompanying drawings wherein:

FIG. 1 is a perspective view of a knockdown furniture structure embodying the knockdown fitting assemblies of the present invention;

FIG. 2 is a fragmentary vertical sectional view through the furniture structure of FIG. 1 and illustrating assembly of the furniture structure;

FIG. 3 is a fragmentary vertical sectional view taken on the same plane as FIG. 2 and showing a portion of the bottom shelf on a larger scale;

FIG. 4 is a fragmentary transverse sectional view taken on the plane 4—4 of FIG. 3;

FIG. 5 is a fragmentary vertical sectional view taken on the same place as FIG. 2 and illustrating assembly of the intermediate shelf on a larger scale than FIG. 2;

FIG. 6 is a fragmentary horizontal sectional view taken on the plane 6—6 of FIG. 5;

FIG. 7 is an exploded perspective view of the knockdown fitting assembly; and

FIG. 8 is a fragmentary vertical sectional view through a furniture structure, and illustrating a modified form of knockdown fitting assembly.

The knockdown fitting assembly of the present invention is generally adapted for interconnecting panels of a knockdown furniture structure in right angular relationship. The knockdown fitting assemblies are herein shown applied to a bookcase to interconnect the bottom, intermediate, and top shelves of the bookcase to the upright end panels. The knockdown fitting assemblies of the present invention can similarly be used to interconnect panels in other knockdown furniture structures such as cabinets, tables, benches and the like.

Referring now more specifically to the accompanying drawings, the knockdown furniture structure shown in FIG. 1 is in the form of a bookcase and includes upright panels 10 and 11 and a plurality of horizontal panels or shelves including a bottom panel 12, intermediate panel 13, and a top panel 14. Back panels 15 and 16 are advantageously provided and arranged to not only rigidify the structure but also retain at least some of the horizontal panels against withdrawal. Knockdown fitting assemblies 21 constructed in accordance with the present invention are provided for connecting the ends of the panels in right angular relation. In the shelf structure illustrated, the ends of the bottom and intermediate shelves abut against the inner side faces of the uprights and the knockdown fitting assemblies are arranged to connect the ends of the bottom and intermediate shelves to the upright panels with the end edges of the bottom and intermediate panels abutting the inner side faces or the upright panels. The top panel 14 overlaps the upper ends of the upright panels and the knockdown fitting assemblies are arranged to connect the top panel to the upright panels with the upper ends of the upright panels 10 and 11 abutting the lower side face of the top panel. Knockdown fitting assemblies of the same construction can be used for connecting the bottom, intermediate and upper shelves to the uprights and at least one fitting assembly and preferably two or more depending on the width of the panels are provided for connecting each end of one panel to a relatively transverse panel.

Each knockdown fitting assembly 21 includes a pair of bracket members of the same configuration and like numerals are used to designate the same parts of each of the bracket members of the pair. For convenience, the bracket member of each pair attached to the upright panel is herein identified as 21v and the bracket member of each pair attached to a horizontal panel is designated 21h. Each bracket member is of unitary construction and has a mounting pad portion 22 and a blade portion 23 that extends perpendicular to an inner side face 22a of the mounting pad portion and medially between relatively parallel left and right side edges 22b and 22c of the mounting pad portion (as viewed from the inner side face of the mounting pad portion with the blade portion extending forwardly). The mounting pad portion also has an outer side face 22d and the first and second end edges 22e and 22f.

The blade portion 23 has left and right side faces 23b and 23c and the blade portion extends forwardly from the end edge 22e of the mounting pad portion and has a lead end edge 23e that is spaced forwardly from the end edge 22e of the mounting pad portion. The part of the blade portion that extends beyond the mounting pad portion has an edge 23d that is preferably disclosed coplanar with the outer face 22d of the mounting pad portion. The side edge 23a of the blade portion that is spaced from the mounting pad portion is conveniently disposed parallel to the mounting pad portion and the rear end edge 23f of the blade portion extends transverse to the mounting pad portion and is conveniently coplanar with the end edge 22f of the mounting pad portion.

The blade portion 23 of each bracket member has a notch extending into the lead edge and, as shown, the notches have spaced sides 23g and 23h and a base 23i. The inlet end of the notch is conveniently bevelled as indicated at 23m and 23n to facilitate interfitting of the notches in the blade portions of the pair of bracket members. The bracket members 21v and 21h are preferably molded of a synthetic resin material of a type and thickness to make it relatively rigid, and yet sufficiently resilient to allow the blade portion to deform slightly and accommodate minor variations in position or alignment of the blade portions when the pair of bracket members are moved into interfitting relation. The notches have a width between the walls 23g and 23h approximating the spacing between the side walls 23b and 23c of the blade portion to receive the blade portion of the other bracket member. The bracket members 21v and 21h are adapted to interfit when they are moved along a path in a direction toward each other with the lead edges of the blade portions of the bracket members juxtaposed as shown in FIG. 7 and with the blade portions of the bracket members in relatively crossing right angular relation. When the bracket members 21v and 21h are in interfitting relation, as shown in FIGS. 3 and 4 and at the bottom of FIG. 2, one of the side edges 22b, 22c of the mounting pad portion of one bracket member 21v is disposed coplanar with the outer side face 22d of the mounting pad portion of the other bracket member 21h and, similarly, one of the side edges 22b, 22c of the mounting pad portion of the bracket member 21h is disposed coplanar with the outer side face 22d of the mounting pad portion of the bracket member 21v.

Stated otherwise, the spacing between the side edges 22b and 22c of the mounting pad portion from the side walls 23b and 23c respectively of the blade portion is equal to the spacing between the side wall 23g of the notch and the outer side wall 22d of the mounting pad portion. The end edges 22e on the mounting pad portions of the bracket members of each pair are arranged to abut when the mounting brackets are interfitted to position the panels. As shown, the end edge 22e of the mounting pad portion is spaced from the lead edge 23e of the blade portion a distance no greater and preferably slightly less than the spacing between the lead edge 23e and the base 23i of the notch in the blade portion.

The bracket members are attached to the respective panels by suitable fasteners. Although screws, nails, or bolts can be utilized, staples 31 are preferred, with at least one staple driven through the mounting pad portion at each side of the blade portion and into the respective panel. As is common practice with stapling, the staples are conveniently formed with slightly outwardly flared or curved tips so that the inner ends of the staples diverge somewhat when driven into the panel as shown in FIG. 6 and provide a firm attachment of the bracket members to the respective panel.

As previously described, the knockdown bracket assemblies are provided to interconnect two panels in right angular relation with one edge of one panel abutting a side face of the second panel. In the shelf structure illustrated, the lower and intermediate shelves 12 and 13 have their end edges in abutting relation with the inner side faces of the uprights 10 and 11. One of the bracket members 21h of each bracket assembly is attached to each of the horizontal panels or shelves such as 12 and 13 with one of the side edges 22b, 22c of the mounting pad portion disposed coplanar with the end edge of the shelf. The other bracket member 21v of the knockdown fitting assembly is attached to the upright panel with one of the side edges 22b, 22c at a level corresponding to the desired level of the under side of the shelf so as to underlie and guide the shelf during installation and to support the shelf after it is installed. The bracket members 21v and 21h are positioned crosswise of the respective upright shelf at locations to interfit when the shelf is in proper position on the uprights. As shown in FIG. 2, the shelves are installed by first positioning the shelves between the uprights with the shelves resting on one of the side edges 22b, 22c of the bracket members 21v attached to the upright panels, and with the leading ends of the blade portions of the bracket members 21v and 21h juxtaposed and with the blade members crossing in right angular relation. The shelf is then moved in a direction such as indicated by the arrow in FIG. 2 to move the bracket members 21h and 21v toward each other until the notches interfit and the lead end edges 22e on the mounting pad portions of the bracket members engage to horizontally position the shelf on the upright as shown in FIG. 3. The bracket members are conveniently located at the lower side of the shelf so as to be concealed by the shelves and front end rear rails 12b and 12c are conveniently provided on the lower shelf to conceal the bracket members. Similarly, a front rail 13a is provided on the intermediate shelf to conceal the knockdown fitting assemblies from the front and a rail 14a provided on the top shelf.

The shelves are thus assembled on the uprights by moving them horizontally along a path paralleling the plane of the shelves and transverse to the lengthwise axis of the shelves. In order to prevent accidental disassembly of the shelves from the uprights, provision is made for retaining the shelves against endwise movement after the bracket members are in interfitting relation. The upright panels 10 and 11 are provided with grooves 10a on their inner side faces for receiving the back panels 15 and 16. The lower shelf 12 is provided with a groove 12c on its upper surface for receiving the lower edge of the back panel 15 so that the back panel 15 will lock the lower shelf against endwise movement after it has been assembled from the uprights. Similarly, intermediate shelf 13 is provided with a groove 13c for receiving the lower edge of the back panel 16, to thereby lock the intermediate panel against endwise movement.

The upper panel or shelf 14 overlies the upper ends of the upright panels 10 and 11. The knockdown fitting assemblies are mounted on the upright panels on the top shelf in a manner similar to that previously described in connection with the lower and intermediate shelves except that the bracket members 21v that are attached to the uprights for the top shelf are located so that the side edges 22c of the mounting pad portions of the bracket members are coplanar with the upper edge of the upright panels and the bracket members 21h that are attached to the top panel are spaced inwardly from the end edges of the top panel a distance such that one of the side edges 22b, 22c of the mounting pad portion engage the inner side face of the upright panels. Any suitable means may be provided for locking the top panel 14 against movement. In the embodiment shown in FIG. 8, a modified knockdown fitting assembly is disclosed having a latch and keeper means on the bracket members for releasably retaining the bracket members in interfitting relation. The bracket members shown in the embodiment of FIG. 8 have a construction similar to that described in connection with FIGS. 1–7 and like numerals are used to designate corresponding parts. In this embodiment, however, the bracket members 21v' and 21h' are modified by providing a latch 23o adjacent the notch in the blade portion 23 and a keeper 23p at each side of the blade portion at a location to be engaged by the latch 23o when the parts are in interfitting relation. In this manner, the latch and keeper releasably hold the parts in interfitting relation.

From the foregoing it is thought that the construction, operation and use of the knockdown fitting assemblies will be readily understood. The pair of bracket members in each fitting assembly are of like construction and this reduces the number of parts that have to be manufactured and simplifies installation of the knockdown fitting assemblies on the panels of the furniture structure. In cabinets and shelf structures in which both ends of the horizontal panels are connected to uprights, the same knockdown fitting assemblies can be used at both ends of the horizontal panels. The knockdown fitting assemblies attached to the upright panels have an edge of the mounting pad portion that underlies the shelves to guide the shelves during movement of the bracket assemblies into interfitting relation and to underlie and support the shelves when the shelves are assembled on the uprights. Further, since the bracket members interfit when moved along a path paralleling the plane of the shelves, the bracket members provide a rigid support for the shelves against movement in a direction transverse to the plane of the shelves. The end edges 22e of the bracket members of each pair abut when the bracket members are in proper interfitting relation to provide a positive stop for horizontally positioning the shelf members on the uprights.

The embodiments of the invention in which an exclusive property or privilege is claimed are defined as follows:

1. A knockdown fitting assembly for securely connecting a pair of panels in right angular relation, the knockdown fitting assembly including a pair of bracket members of the same configuration, each bracket member being of unitary construction and having a mounting pad portion and a blade portion, the mounting pad portion having inner and outer side faces and spaced side edges, the blade portion extending perpendicular to said inner side face of the mounting pad portion and medially between and spaced inwardly from said spaced side edges of the mounting pad portion, to provide a mounting flange at each side of the blade portion, the blade portion of each bracket member having a notch extending inwardly from a lead end edge, the notches in the blade portions of the bracket members being adapted to interfit when the pair of bracket members are moved along a path in one direction toward each other with the lead end edges of the blade portions of the pair of bracket members juxtaposed and with the blade portions of the pair of bracket members in relatively crossing right angular relation, the notches in the blade portion of each bracket member being spaced from its outer face a distance such that each bracket member has one side edge of its mounting pad portion disposed in a plane through the outer face of the mounting pad portion on the other bracket member when the notches in the blade portions of the pair of bracket members interfit.

2. A knockdown fitting assembly according to claim 1 wherein the mounting pad portion of each bracket member has a lead end edge spaced inwardly from the lead end edge of the blade portion a distance no greater than the spacing of the base of the notch from the lead end edge of the blade portion and such that the lead end edge on the mounting pad portion on one bracket member engages the lead end edge on the mounting pad portion on the other bracket member when the notches in the blade portion of the pair of bracket members interfit.

3. A knockdown fitting assembly according to claim 1 wherein the bracket members are each formed of synthetic resin material.

4. A knockdown fitting assembly according to claim 1 including retaining means on the pair of bracket members for inhibiting relative movement along said path in a direction away from each other when the notches in the blade portions of the bracket members are in interfitting relation.

5. A knockdown fitting assembly according to claim 4 wherein said retaining means includes a latch on the blade portion of each bracket member and a keeper on the blade portions of each bracket member, the latches and keepers being disposed at locations such that the latch on the blade portion of one bracket member engages the keeper on the blade portion of the other bracket member when the notches in the blade portions of the bracket members are in interfitting relation.

6. In a knockdown structure including at least first and second panels in right angular relation with one end edge of the first panel abutting one side face of the second panel, a knockdown fitting assembly for securely connecting the first and second panels in right angular relation, the knockdown fitting assembly including a pair of bracket members of the same configuration, each bracket member being of unitary construction and having a mounting pad portion and a blade portion, the mounting pad portion having inner and outer side faces and spaced side edges, the blade portion extending perpendicular to an inner side face of the mounting pad portion and medially between and spaced inwardly from said spaced side edges of the mounting pad portion to provide a mounting flange at each side of the blade portion, the blade portion of each bracket member having a notch extending inwardly from a lead end edge, the notches in the blade portions of the bracket members being adapted to interfit when the pair of bracket members are moved along a path in one direction toward each other with the lead end edges of the blade portions of the bracket members juxtaposed and with blade portions of the pair of bracket members in relatively crossing right angular telation, means securing the mounting pad portion of one bracket member to one side face of said first panel adjacent said one end edge thereof, and means securing the mounting pad portion of the other bracket member to said one side face of the second panel, the notches in the blade portions of the pair of bracket members being adapted to move into interfitting relation when the first and second panels are moved in said direction relative to each other along said path with said first and second panels in right angular relation, the notch in the blade portion of each bracket member being spaced from its outer face a distance such that each bracket member has one side edge of its mounting pad portion disposed in a plane through the outer face of the mounting pad portion on the other bracket member when the notches in the blade portions of the pair of bracket members interfit.

7. A knockdown structure according to claim 6 wherein the bracket member attached to said first panel has one side edge of its mounting pad portion disposed coplanar with said one end edge of the first panel to thereby engage said one side face of the second panel, one side edge of the mounting pad portion of the bracket member attached to second panel engaging said one side face of the first panel adjacent said one end edge thereof.

8. A knockdown structure according to claim 6 wherein the mounting pad portion of each bracket member has a lead end edge spaced inwardly from the lead end edge of the blade portion a distance no greater than the spacing of the base of the notch from the lead end edge of the blade portion and such that the lead end edge of the mounting pad portion on one bracket member engages the lead end edge on the mounting pad portion of the other bracket member when the notches in the blade portions of the bracket members are in interfitting relation.

9. A knockdown structure according to claim 8 wherein the bracket members are each formed of synthetic resin material.

10. A knockdown structure according to claim 6 including retaining means on the pair of bracket members for inhibiting relative movement along said path in a direction away from each other when the notches in the blade portions of the bracket members are in interfitting relation.

11. A knockdown structure according to claim 10 wherein said retaining means includes a latch on the blade portion of each bracket member and a keeper in the blade portions of each bracket member, the latches and keepers being disposed at locations such that the latch on the blade portion of one bracket member engages the keeper on the blade portion of the other bracket member when the notches in the blade portions of the bracket members are in interfitting relation.

12. A knockdown structure according to claim 6 including retaining means engageable with said first and second panels for inhibiting relative movement of said panels along said path in a direction opposite said one direction when the notches in the blade portions of the bracket members are in interfitting relation.

13. A knockdown fitting assembly according to claim 6 including a third panel adapted to be disposed perpendicular to said first and second panels, and panel retaining means on said first and second panels engageable with said third panel to inhibit relative movement of said first and second panels and the bracket members thereon along said path in a direction opposite said one direction.

14. A knockdown fitting assembly for securely connecting a pair of panels in right angular relation, the knockdown fitting assembly including a pair of bracket members of the same configuration, each bracket member being of unitary construction and having a mounting pad portion and a blade portion extending perpendicular to an inner side face of the mounting pad portion and medially between relatively parallel side edges of the mounting pad portion, the blade portion of each bracket member having a notch in a lead end edge, the notches in the blade portions of the bracket members being adapted to interfit when the pair of bracket members are moved along a path in one direction toward each other with the lead end edges of the blade portions of the pair of bracket members juxtaposed and with the blade portions of the pair of bracket members in relatively crossing right angular relation, retaining means on the pair of bracket members for inhibiting relative movement along said path in a direction away from each other when the notches in the blade portions of the bracket members are in interfitting relation, said retaining means including a latch on the blade portion of each bracket member and a keeper on the blade portions of each bracket member, the latches and keepers being disposed at locations such that the latch on the blade portion of one bracket member engages the keeper on the blade portion of the other bracket member when the notches in the blade portions of the bracket members are in interfitting relation.

* * * * *